(12) United States Patent
Daisho

(10) Patent No.: US 8,256,478 B2
(45) Date of Patent: Sep. 4, 2012

(54) PNEUMATIC TIRE

(75) Inventor: Yasujirou Daisho, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 21 days.

(21) Appl. No.: 12/907,544

(22) Filed: Oct. 19, 2010

(65) Prior Publication Data

US 2011/0094639 A1    Apr. 28, 2011

(30) Foreign Application Priority Data

Oct. 28, 2009    (JP) ................. 2009-247978

(51) Int. Cl.
*B60C 9/08*    (2006.01)
*B60C 11/03*    (2006.01)
*B60C 11/18*    (2006.01)
*B60C 15/06*    (2006.01)

(52) U.S. Cl. .......... 152/209.5; 152/209.8; 152/546; 152/547; 152/541; 152/554; 152/560

(58) Field of Classification Search ............. 152/209.5
See application file for complete search history.

(56) References Cited

U.S. PATENT DOCUMENTS

| | | | | |
|---|---|---|---|---|
| 4,580,608 A * | 4/1986 | Rampl | | 152/209.5 |
| 6,223,797 B1 * | 5/2001 | Shida et al. | | 152/532 |
| 6,719,025 B2 * | 4/2004 | Caretta et al. | | 152/209.5 |
| 7,673,663 B2 * | 3/2010 | Murata | | 152/209.8 |
| 2007/0144644 A1 * | 6/2007 | Zanzig et al. | | 152/209.5 |
| 2007/0193669 A1 * | 8/2007 | Giannini et al. | | 152/209.5 |

FOREIGN PATENT DOCUMENTS

| | | |
|---|---|---|
| JP | 05-238208 | 9/1993 |
| JP | 06-016099 | 1/1994 |
| JP | 2000-052709 | 2/2000 |
| JP | 2003-326917 | 11/2003 |
| JP | 2004-345432 | 12/2004 |
| JP | 2009-040204 | 2/2009 |

OTHER PUBLICATIONS

English Language Machine Translation of JP 2002-127712 (2002).*

* cited by examiner

*Primary Examiner* — Justin Fischer
*Assistant Examiner* — Philip N Schwartz
(74) *Attorney, Agent, or Firm* — Thorpe North & Western LLP

(57) ABSTRACT

A pneumatic tire includes at least two types of cap tread rubber layers made from differing rubber compositions disposed in a tread portion. A tan δ at 60° C. of a rubber composition forming the cap tread rubber layer on a vehicle outer side is greater than a tan δ at 60° C. of a rubber composition forming the cap tread rubber layer on a vehicle inner side. A ratio (tan δH/tan δL) of a maximum tan δH to a minimum tan δL at 60° C. of the tan δ of the rubber compositions forming the at least two types of cap tread rubber layers is from 1.05 to 1.80. An under tread rubber layer disposed in the tread portion has an average thickness from 0.8 mm to 4.0 mm. A hardness of a rubber composition forming the under tread rubber layer is from 73 to 83. A tan δ at 60° C. of the rubber composition forming the under tread rubber layer is 0.25 or less.

19 Claims, 2 Drawing Sheets

PNEUMATIC TIRE

PRIORITY CLAIM

This application is based upon and claims the benefit of priority from Japanese Patent Application No. 2009-247978, filed Oct. 28, 2009, the entire contents of which is incorporated herein by reference.

BACKGROUND

1. Technical Field

The present disclosure relates to a pneumatic tire having a designated tire inner side/outer side mounting orientation when mounted on a vehicle and particularly relates to a pneumatic tire that can enhance steering stability and high-speed durability during high-speed travelling without negatively affecting riding comfort.

2. Related Art

In recent years, there have been strict demands for reductions in the weight of pneumatic tires that are to be mounted on vehicles for which high-speed travelling is expected, such as sports cars and the like. However, for pneumatic tires that satisfy the demand for reduced weight, there is an additional demand of ensuring steering stability equivalent to or greater than that of conventional tires.

In order to meet these demands, pneumatic tires have been proposed including, for example, a carcass layer with a single-ply construction mounted between a pair of bead portions and a belt layer disposed on an outer circumferential side of the carcass layer corresponding to a tread portion, wherein the carcass layer is wrapped around bead cores disposed in each of the bead portions from a tire inner side to a tire outer side, a bead filler disposed on the bead cores is sandwiched between a main body portion and a wrapped portion of the carcass layer, and the wrapped portion of the carcass layer is extended to a lower region of the belt layer so as to overlap with an end of the belt layer.

Such pneumatic tires having a carcass layer with a single-ply construction that is extended to the lower region of the belt layer so that the wrapped portion overlaps with the end of the belt layer can exhibit superior steering stability due to the overlapping of the main body portion and the wrapped portion of the carcass layer in side wall portions while achieving a weight reduction effect due to making the carcass layer single-ply.

Additionally, a pneumatic tire having a designated tire inner side/outer side mounting orientation when mounted on a vehicle is proposed having at least two types of cap tread rubber layers, made from differing rubber compositions, disposed in the tread portion so as to be adjacent to each other in a tire width direction, wherein a tan $\delta$ at 60° C. of a rubber composition forming the cap tread rubber layer on a vehicle outer side is greater than a tan $\delta$ at 60° C. of the rubber composition forming the cap tread rubber layer on a vehicle inner side.

Steering stability can be enhanced by thus making the tan $\delta$ at 60° C. of the rubber composition forming the cap tread rubber layer on the vehicle outer side relatively greater. Additionally, while variations in steering stability performance due to heat generation easily occur when the tan $\delta$ throughout a entirety of the tread portion is increased, it is possible to suppress variations in steering stability performance caused by continued traveling while enhancing steering stability by making the tan $\delta$ at 60° C. of the rubber composition forming the cap tread rubber layer on the vehicle inner side relatively less.

However, with pneumatic tires to be mounted on vehicles for which high-speed travelling is expected, there is a demand for further enhancement of steering stability and high-speed durability during high-speed travelling, and that demand is difficult to meet. Additionally, it is also possible to enhance steering stability and high-speed durability during high-speed travelling by adding a reinforcing member to the tread portion and/or the side wall portions but, in these cases, there are demerits such as riding comfort being negatively affected, and the like.

An object of the present disclosure is to provide a pneumatic tire that can enhance steering stability and high-speed durability during high-speed travelling without negatively affecting riding comfort.

SUMMARY

In order to achieve the aforementioned object, the pneumatic tire of the present disclosure is a pneumatic tire having a designated tire inner side/outer side mounting orientation when mounted on a vehicle, including at least two types of cap tread rubber layers made from differing rubber compositions disposed in a tread portion so as to be adjacent to each other in a tire width direction, wherein a tan $\delta$ at 60° C. of a rubber composition forming the cap tread rubber layer on a vehicle outer side is greater than a tan $\delta$ at 60° C. of a rubber composition forming the cap tread rubber layer on a vehicle inner side, a ratio (tan $\delta$H/tan $\delta$L) of a maximum tan $\delta$H to a minimum tan $\delta$L at 60° C. of the rubber compositions forming the at least two types of cap tread rubber layers is from 1.05 to 1.80, an under tread rubber layer is disposed in the tread portion as a base for the at least two types of cap tread rubber layers, wherein an average thickness of the under tread rubber layer is from 0.8 mm to 4.0 mm, a hardness at 20° C. of a rubber composition forming the under tread rubber layer is from 73 to 83 and is greater than a hardness at 20° C. of the rubber compositions forming the at least two types of cap tread rubber layers, and a tan $\delta$ at 60° C. of the rubber composition forming the under tread rubber layer is 0.25 or less.

According to the present disclosure, in a pneumatic tire having a designated tire inner side/outer side mounting orientation when mounted on a vehicle, by making the tan $\delta$ at 60° C. of the rubber composition forming the cap tread rubber layer on the vehicle outer side relatively greater, grip during cornering based on the physical properties of the cap tread rubber layer on the vehicle outer side can be enhanced and steering stability can be enhanced. On the other hand, by making the tan $\delta$ at 60° C. of the rubber composition forming the cap tread rubber layer on the vehicle inner side relatively less, heat generation in the cap tread rubber layer on the vehicle inner side can be suppressed. Therefore, variations in steering stability performance due to continued traveling can be suppressed while enhancing steering stability.

Furthermore, the under tread rubber layer is disposed in the tread portion as a base for the at least two types of cap tread rubber layers. By increasing the hardness at 20° C. of the rubber composition forming the under tread rubber layer and suppressing heat generation through lowering the tan $\delta$ at 60° C. of the rubber composition forming the under tread rubber layer, high-speed durability and steering stability during high-speed travelling can be further enhanced. Moreover, the under tread rubber layer can be added as a base to the cap tread rubber layers without negatively affecting riding comfort.

With the present disclosure, it is preferable that at least one main groove extending in a tire circumferential direction is provided in the tread portion, the at least one main groove forming an asymmetric tread pattern wherein a groove area ratio GAo of a ground contact region from a tread center-line to the vehicle outer side is less than a groove area ratio GAi of a ground contact region from the tread center-line to the vehicle inner side. As a result, the effect of suppressing variations in steering stability performance due to continued traveling can be sufficiently obtained while enhancing steering stability.

With the asymmetric tread pattern, it is preferable that a difference (GAi–GAo) between the groove area ratio GAo of the ground contact region of the vehicle outer side and the groove area ratio GAi of the ground contact region of the vehicle inner side is set to be in a range of from 1% to 15%. As a result, the effect of suppressing variations in steering stability performance due to continued traveling can be sufficiently obtained while enhancing steering stability.

Furthermore, with the present disclosure, in order to achieve both a reduction in weight and greater steering stability, it is preferable that a construction be employed including a carcass layer with a single-ply construction with a cord angle with respect to the tire circumferential direction of from 75° to 90° mounted between a pair of bead portions, and a belt layer disposed on an outer circumferential side of the carcass layer corresponding to the tread portion. The carcass layer is wrapped around a bead core disposed in each of the bead portions from a tire inner side to a tire outer side, a bead filler disposed on the bead core is sandwiched between a main body portion and a wrapped portion of the carcass layer, and the wrapped portion of the carcass layer is extended to a lower region of the belt layer so as to overlap with an end of the belt layer.

However, the present disclosure is not limited to pneumatic tires having a construction including a carcass layer with a single-ply construction wherein the wrapped portion of the carcass layer is extended to a lower region of the belt layer so as to overlap with an end of the belt layer. The present disclosure can also be applied to pneumatic tires provided with carcass layers with multiple plies, or pneumatic tires with the wrapped portion of the carcass layer disposed more towards the inner side of the tire radial direction than a tire maximum width location.

Additionally, it is preferable that a height of the bead filler from a bead heel is 30% or less of a tire cross-section height, and a tan δ at 60° C. of a rubber composition forming the bead filler is 0.20 or less. By thus shortening the bead filler that repeatedly deforms during tire rolling and lowering the tan δ at 60° C. of the rubber composition forming the bead filler, heat generated in the tire due to continued traveling on a circuit can be suppressed and variations in steering stability performance can be suppressed. As a result, initial steering stability can be maintained over extended periods of time during continued driving.

In the present disclosure, "height of the bead filler from the bead heel" refers to a height measured according to conditions for measuring tire dimensions established by the regulations on which tires are based, and is the dimension in the tire radial direction from the bead heel, which corresponds with a base position of a rim diameter, to a peak of the bead filler. "Hardness at 20° C." refers to a durometer hardness measured using a type-A durometer stipulated in Japanese Industrial Standard (JIS) K6253. "Tan δ at 60° C." refers to a tan δ measured using a viscoelastic spectrometer (manufactured by Toyo Seiki Seisakusho, Co., Ltd.) under the following conditions: Temperature=60° C.; Frequency=20 Hz; Initial distortion=10%; Dynamic distortion=±2%. "Groove area ratio" refers to a proportion (%) of a groove area in the ground contact region with respect to a total area of the ground contact region measured according to measurement conditions for a static load radius of a tire established by the regulations on which tires are based.

While applicable to all types of pneumatic tires, significant effects can be obtained when the present disclosure is applied to pneumatic tires having tire sizes with aspect ratios of 50% or less, which have narrow flex zones. Particularly, significant effects can be obtained when applied to pneumatic tires to be mounted on vehicles that have camber angles of from –0.5° to –4.0°.

DETAILED DESCRIPTION

Figure 1:
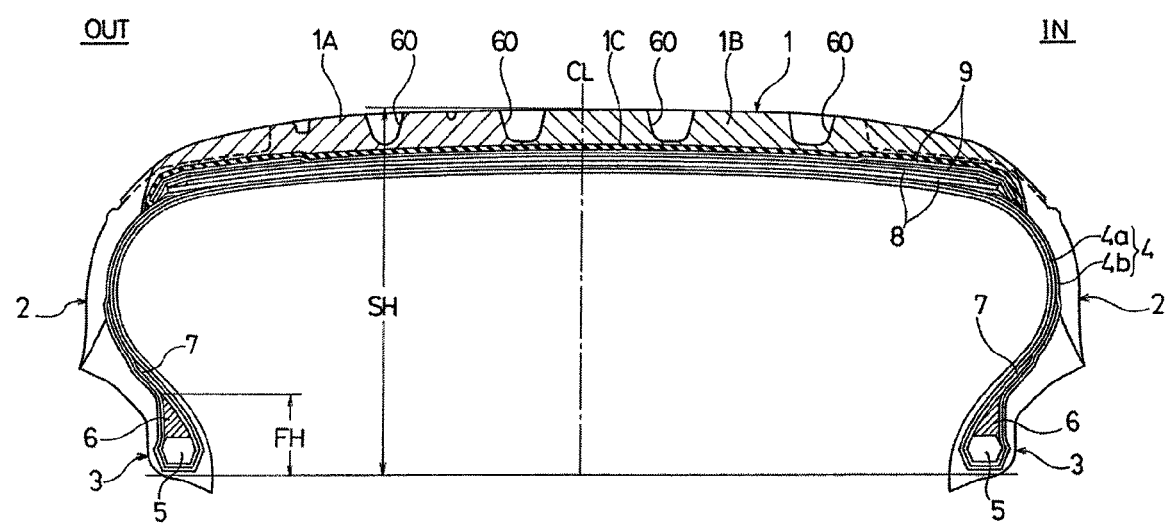
FIG. 1 is a meridian cross-sectional view showing a pneumatic tire according to an example.

Detailed descriptions will be given below of an example configuration of the present disclosure with reference to the accompanying drawings. FIG. 1 shows a pneumatic tire according to an example of the present disclosure. The pneumatic tire is a tire having a designated tire inner side/outer side mounting orientation when mounted on a vehicle. In FIG. 1, "IN" refers to a vehicle inner side of the pneumatic tire when mounted on a vehicle and "OUT" refers to a vehicle outer side when mounted on a vehicle.

In FIG. 1, 1 is a tread portion; 2 is a side wall portion; and 3 is a bead portion. As shown in FIG. 1, a single carcass layer 4 formed from a plurality of aligned carcass cords is mounted between a pair of bead portions 3, 3. It is favorable that organic fiber cords made from rayon, polyester, nylon, aromatic polyamides and the like be used as the carcass cords. A cord angle of the carcass layer 4 with respect to a tire circumferential direction is set to a range of from 75° to 90° and preferably from 80° to 87°. Steering stability and other performance factors demanded can be maintained without affecting tire mass by, for example, setting the cord angle of the carcass layer 4 with respect to the tire circumferential direction to a high angle when a load ratio is low and to a low angle when the load ratio is high. The carcass layer 4 is wrapped around a bead core 5 from a tire inner side to a tire outer side. In other words, the carcass layer 4 is formed from a main body portion 4a and a wrapped portion 4b, having the bead core 5 as a boundary.

In each of the bead portions 3, a bead filler 6 that is formed from a rubber composition having a high degree of hardness is disposed on an outer circumference of the bead core 5. The bead filler 6 is sandwiched between the main body portion 4a and the wrapped portion 4b of the carcass layer 4. Additionally, a side reinforcing layer 7 including reinforcing cords inclining with respect to the tire circumferential direction is embedded in each of the bead portions 3. In order to obtain satisfactory reinforcing effects, it is preferable that a cord angle of the side reinforcing layers 7 with respect to the tire circumferential direction is from 15° to 65°. The reinforcing cords of the side reinforcing layers 7 can comprise steel cords or organic fiber cords made from polyester, nylon, aromatic polyamides, and the like. When using organic fiber cords as the reinforcing cords of the side reinforcing layers 7, it is favorable that the side reinforcing layers 7 be disposed so as to enclose the bead core 5 and the bead filler 6 as illustrated in the figure. When using steel cords as the reinforcing cords of the side reinforcing layers 7, it is favorable that the side reinforcing layers 7 be disposed between the bead filler 6 and the wrapped portion 4b of the carcass layer 4.

A plurality of belt layers 8 including reinforcing cords inclining with respect to the tire circumferential direction are disposed on an outer circumferential side of the carcass layer 4 corresponding to the tread portion 1. Furthermore, a belt cover layer 9 including reinforcing cords oriented in the tire circumferential direction is disposed on an outer circumferential side of the belt layers 8. Moreover, the aforementioned wrapped portion 4b of the carcass layer 4 extends to a lower region of the belt layers 8 so as to overlap an end, in a tire width direction, of the belt layers 8.

Two types of cap tread rubber layers 1A, 1B made from differing rubber compositions are disposed in the tread portion 1 so as to be adjacent to each other in the tire width direction. Moreover, a tan δ at 60° C. of a rubber composition that forms the cap tread rubber layer 1A on the vehicle outer side is greater than a tan δ at 60° C. of a rubber composition forming the cap tread rubber layer 1B on the vehicle inner side. More specifically, a ratio (tan δH/tan δL) of a maximum tan δH to a minimum tan δL at 60° C. of the rubber compositions forming the cap tread rubber layers 1A, 1B is set to a range of from 1.05 to 1.80. It is favorable that the tan δ at 60° C. of the rubber composition forming the cap tread rubber layers 1A, 1B be in a range of from 0.10 to 0.50.

Furthermore, an under tread rubber layer 1C is disposed in the tread portion 1 as a base for the two types of cap tread rubber layers 1A, 1B. An average thickness of the under tread rubber layer 1C is set to be in a range of from 0.8 mm to 4.0 mm. Note that the "average thickness of the under tread rubber layer 1C" refers to the average thickness of a portion of the under tread rubber layer 1C located away from an outermost edge of the belt layers 8 and towards an inner side in the tire width direction. Additionally, a hardness at 20° C. of a rubber composition forming the under tread rubber layer 1C is from 73 to 83 and is greater than a hardness at 20° C. of the rubber compositions forming the at least two types of cap tread rubber layers 1A, 1B. Furthermore, a tan δ at 60° C. of the rubber composition forming the under tread rubber layer 1C is 0.25 or less.

In such a pneumatic tire having a designated tire inner side/outer side mounting orientation when mounted on a vehicle, by making the tan δ at 60° C. of the rubber composition forming the cap tread rubber layer 1A on the vehicle outer side relatively greater, grip during cornering based on the physical properties of the cap tread rubber layer 1A on the vehicle outer side can be enhanced and steering stability, particularly high-speed lane changing performance, during high-speed travelling can be enhanced. On the other hand, by making the tan δ at 60° C. of the rubber composition forming the cap tread rubber layer 1B on the vehicle inner side relatively less, heat generation in the cap tread rubber layer 1B on the vehicle inner side can be suppressed. Therefore, variations in steering stability performance due to continued traveling can be suppressed while enhancing steering stability.

Here, the ratio (tan δH/tan δL) of the maximum tan δH to the minimum tan δL at 60° C. of the rubber compositions forming the cap tread rubber layers 1A, 1B is set to a range of from 1.05 to 1.80. If the ratio (tan δH/tan δL) is too small, the effect of suppressing variations in steering stability performance will fall. However, if the ratio is too large, the necessary grip strength will be unobtainable. Note that it is favorable to dispose a boundary between the cap tread rubber layers 1A, 1B under a main groove 60 that extends in a tire circumferential direction in the tread portion 1. Thereby, occurrences of uneven wear caused by differences in the rubber compositions can be suppressed.

In the present example, the two types of cap tread rubber layers 1A, 1B made from differing rubber compositions are disposed in the tread portion 1. However, two types or more of cap tread rubber layers can be disposed so as to be adjacent to each other in the tire width direction.

Furthermore, in the pneumatic tire described above, the under tread rubber layer 1C is disposed in the tread portion 1 as a base for the two types of cap tread rubber layers 1A, 1B. By increasing the hardness at 20° C. of the rubber composition forming the under tread rubber layer 1C and suppressing heat generation through lowering the tan δ at 60° C. of the rubber composition forming the under tread rubber layer 1C, high-speed durability and steering stability during high-speed travelling can be enhanced. Moreover, the under tread rubber layer 1C can be added as a base to the cap tread rubber layers 1A, 1B without negatively affecting riding comfort.

Here, the average thickness of the under tread rubber layer 1C is set to be in a range of from 0.8 mm to 4.0 mm. If the average thickness is less than 0.8 mm, the enhancement effect in steering stability will be unobtainable. However, if the average thickness exceeds 4.0 mm, riding comfort will be negatively affected. Note that the average thickness of the under tread rubber layer 1C is preferably from 7% to 50% of a maximum thickness of all of the tread rubber layers including the cap tread rubber layers 1A, 1B and the under tread rubber layer 1C.

Additionally, the hardness of the rubber composition at 20° C. forming the under tread rubber layer 1C is set to be in a range of from 73 to 83. If the hardness is less than 73, the enhancement effect in steering stability will be unobtainable. However, if the hardness exceeds 83, riding comfort and wet performance will be negatively affected. The hardness at 20° C. of the rubber composition forming the under tread rubber layer 1C is made to be greater than the hardness at 20° C. of the rubber composition forming the cap tread rubber layers 1A, 1B. However, if this relationship is reversed, it will no longer be possible to obtain the enhancement effect in steering stability without negatively affecting riding comfort. Specifically, in this case, while the cap tread rubber layers 1A, 1B that contact a road surface are softened, the under tread rubber layer 1C base thereunder is hardened.

Furthermore, the tan δ at 60° C. of the rubber composition forming the under tread rubber layer 1C is set to be 0.25 or less. However, if the tan δ exceeds 0.25, the effect of suppressing the variations in steering stability performance will be insufficient. A lower limit of the tan δ at 60° C. of the rubber composition forming the under tread rubber layer 1C is preferably 0.03.

With the pneumatic tire described above, the carcass layer 4 has a single-ply construction and is extended to the lower region of the belt layers 8 so that the wrapped portion 4b overlaps with the end of the belt layers 8 in order to realize both a reduction in weight and steering stability. In other words, the pneumatic tire having the carcass layer 4 with a single-ply construction that is extended to the lower region of the belt layers 8 so that the wrapped portion 4b overlaps with the end of the belt layers 8 can exhibit superior steering stability due to the overlapping of the main body portion 4a and the wrapped portion 4b of the carcass layer 4 in side wall portions 2 while achieving a weight reduction effect due to the single-ply carcass layer 4.

With the pneumatic tire described above, a height FH from bead heel of the bead filler 6 is set to be 30% or less than a tire cross-section height SH, and the tan δ at 60° C. of the rubber composition forming the bead filler 6 is set to be 0.20 or less.

In pneumatic tires, the bead filler 6 repeatedly deforms during rolling. If an amount of heat generated originating in the bead filler 6 as a result of such deformation is great, significant variations in steering stability performance will occur. Therefore, by shortening the bead filler 6, reducing a cross-sectional area thereof, and lowering the tan δ at 60° C. of the rubber composition forming the bead filler 6, heat generated in the tire due to continued traveling on a circuit can be suppressed and variations in steering stability performance can be suppressed. As a result, initial steering stability can be maintained over extended periods of time during continued driving.

If the height FH of the bead filler 6 exceeds 30% of the tire cross-section height SH, the effect of suppressing variations in steering stability performance will be insufficient. A lower limit of the height FH of the bead filler 6 is preferably 10 mm.

Additionally, if the tan δ at 60° C. of the rubber composition forming the bead filler 6 exceeds 0.20, the effect of suppressing the variations in steering stability performance will be insufficient. A lower limit of the tan δ at 60° C. of the rubber composition forming the bead filler 6 is preferably 0.03.

Figure 2:
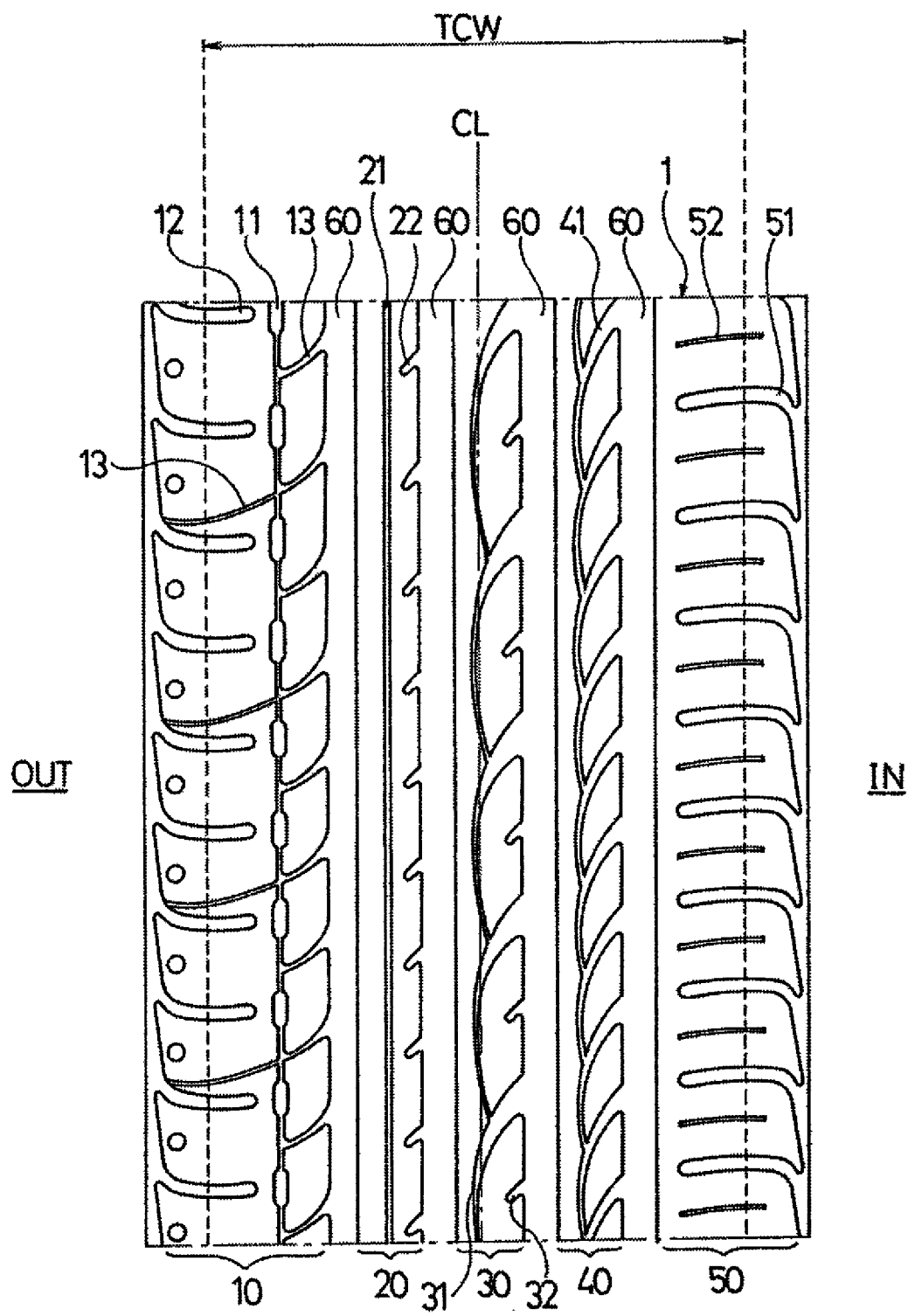
FIG. 2 is a plan view showing a tread pattern of a pneumatic tire according to an example.

FIG. 2 shows a tread pattern of a pneumatic tire according to an example of the present invention. In FIG. 2, CL is a tread center-line. As shown in FIG. 2, a plurality of main grooves 60 extending in the tire circumferential direction is formed in the tread portion 1. These main grooves 60 partition the tread portion 1 into a plurality of land portions 10, 20, 30, 40, 50, from the vehicle outer side toward the vehicle inner side. A narrow groove 11 extending in the tire circumferential direction, a plurality of lateral grooves 12 farther to a tread shoulder side than the narrow groove 11 and extending in the tire width direction, and a plurality of narrow grooves 13 at least closer to the tread center-line than the narrow groove 11 and extending in the tire width direction are formed in the land portion 10, which is the land portion located farthest to the vehicle outer side. A narrow groove 21 extending in the tire circumferential direction and a plurality of notch grooves 22 extending in the tire width direction are formed in the land portion 20. A plurality of curved grooves 31 extending while curving in the tire circumferential direction and a plurality of notch grooves 32 extending in the tire width direction are formed in the land portion 30. A plurality of curved grooves 41 extending while curving in the tire circumferential direction is formed in the land portion 40. A plurality of lateral grooves 51 extending in the tire width direction and a plurality of narrow grooves 52 between the lateral grooves 51 and extending in the tire width direction are formed in the land portion 50, which is the land portion located farthest to the vehicle inner side.

The pneumatic tire described above has at least one main groove 60 extending in the tire circumferential direction formed in the tread portion 1, and, in a total ground contact region defined by a contact width TCW, the at least one main groove 60 forms an asymmetric tread pattern wherein a groove area ratio GAo of a ground contact region from a tread center-line CL to the vehicle outer side is less than a groove area ratio GAi of a ground contact region from the tread center-line CL to the vehicle inner side. As a result, the effect of suppressing variations in steering stability performance due to continued traveling can be sufficiently obtained while enhancing steering stability.

A difference (GAi−GAo) between the groove area ratio GAo of the ground contact region from the tread center-line CL to the vehicle outer side and the groove area ratio GAi of the ground contact region from the tread center-line CL to the vehicle inner side is set to be in a range of from 1% to 15%, and preferably from 2% to 13%. If the difference (GAi−GAo) is too small, the effect of suppressing variations in steering stability performance will fall. However, if the difference is too large, necessary block rigidity will be insufficient, which will lead to a drop in steering stability. It is favorable that a groove area ratio GA of the total ground contact region be set to a range of from 20% to 40%.

WORKING EXAMPLES

Pneumatic tires for a Conventional Example, Working Examples 1 to 5, and Comparative Examples 1 to 4 were manufactured having a tire size of 235/40 R18. Each pneumatic tire included a carcass layer with a single-ply construction mounted, having a cord angle with respect to the tire circumferential direction of 85°, between a pair of bead portions; and a belt layer disposed on an outer circumferential side of the carcass layer corresponding to the tread portion, wherein the carcass layer is wrapped around bead core disposed in each of the bead portions from a tire inner side to a tire outer side, a bead filler disposed on the bead cores is sandwiched between a main body portion and a wrapped portion of the carcass layer, and the wrapped portion of the carcass layer is extended to a lower region of the belt layer so as to overlap with an end of the belt layer. In such pneumatic tires the height of the bead filler from the bead heel (percentage of the tire cross-section height), the tan δ at 60° C. of the rubber composition forming the bead filler, the hardness at 20° C. of the rubber composition forming the under tread rubber layer, the average thickness of the under tread rubber layer, the tan δ at 60° C. of the rubber composition forming the under tread rubber layer, the hardness at 20° C. of the rubber compositions forming the cap tread rubber layers on the vehicle outer side and the vehicle inner side, the tan δ at 60° C. of the rubber compositions forming the cap tread rubber layers on the vehicle outer side and the vehicle inner side, and the groove area ratios of the vehicle outer side and the vehicle inner side were set to the values shown in Table 1.

These test tires were subjected to high-speed durability, high-speed lane changing performance, variation in steering stability performance, and riding comfort testing according to the following test methods. Each performance factor was evaluated and the results are shown in Table 1.

High-speed Durability:

The test tires were mounted on a drum tester, a load was set to 0.85 times of a maximum load capacity, air pressure was adjusted to 250 kPa, a camber angle was set to −2.5°, and speed was set so as to step up 10 km/h every 10 minutes starting from 200 km/h. The distance the tires ran until rupturing was measured. The evaluation results are shown as an index with the Conventional Example being 100. Larger index values indicate superior high-speed durability.

High-speed Lane Changing Performance:

The test tires were assembled on wheels having a rim size of 18×8 J and mounted on a vehicle (camber angle: −2.5°) having an engine displacement of 4,000 cc. The tires were inflated to an air pressure of 250 kPa. Traveling testing and a sensory evaluation of high-speed lane changing were performed by a test driver. Specifically, high-speed lane changing performance was evaluated on a 10 point scale with the Conventional Example being 7. A higher score indicates superior high-speed lane changing performance.

Riding Comfort:

The test tires were assembled on wheels having a rim size of 18×8 J and mounted on a vehicle (camber angle: −2.5°) having an engine displacement of 4,000 cc. The tires were inflated to an air pressure of 250 kPa. Traveling testing and a sensory evaluation of riding comfort were performed by a test driver. Specifically, riding comfort was evaluated on a 10 point scale with the Conventional Example being 7. A higher score indicates superior riding comfort.

Variation in Steering Stability Performance:

The test tires were assembled on wheels having a rim size of 18×8 J and mounted on a vehicle (camber angle: −2.5°) having an engine displacement of 4,000 cc. The tires were inflated to an air pressure of 250 kPa. Continued traveling for 200 km was performed and a sensory evaluation of the change from steering stability during initial traveling to steering stability during final traveling were performed by a test driver. The evaluation results are shown as an index with 100 being a "passing" score. Larger index values indicate less change in performance.

TABLE 1

| | | Conventional Example | W.E.* 1 | W.E. 2 | W.E. 3 | W.E. 4 | W.E. 5 |
|---|---|---|---|---|---|---|---|
| Bead filler height (%) | | 21 | 21 | 21 | 21 | 21 | 21 |
| Bead filler tan δ @ 60° C. | | 0.17 | 0.17 | 0.17 | 0.17 | 0.17 | 0.17 |
| Under tread rubber layer hardness @ 20° C. | | 70 | 78 | 78 | 78 | 74 | 83 |
| Under tread rubber layer average thickness (mm) | | 1.0 | 1.0 | 3.0 | 1.0 | 1.0 | 1.0 |
| Under tread rubber layer tan δ @ 60° C. | | 0.27 | 0.21 | 0.21 | 0.21 | 0.21 | 0.23 |
| Cap tread rubber layer hardness @ 20° C. | Vehicle Outer Side | 73 | 73 | 73 | 73 | 73 | 73 |
| | Vehicle Inner Side | 73 | 73 | 73 | 73 | 73 | 73 |
| Cap tread rubber layer tan δ @ 60° C. | Vehicle Outer Side | 0.33 | 0.33 | 0.33 | 0.33 | 0.33 | 0.33 |
| | Vehicle Inner Side | 0.28 | 0.28 | 0.28 | 0.28 | 0.28 | 0.28 |
| Groove area ratio (%) | Vehicle Outer Side | 35 | 35 | 35 | 32 | 32 | 32 |
| | Vehicle Inner Side | 35 | 35 | 35 | 38 | 38 | 38 |
| High-speed durability (index) | | 100 | 105 | 105 | 110 | 110 | 105 |
| High-speed lane changing performance | | 7 | 7.5 | 8 | 8 | 7.5 | 8 |
| Riding Comfort | | 7 | 7 | 7 | 7.5 | 7.5 | 7 |
| Variation in steering stability performance (index) | | 100 | 105 | 105 | 105 | 105 | 105 |

| | | Comparative Example 1 | Comparative Example 2 | Comparative Example 3 | Comparative Example 4 |
|---|---|---|---|---|---|
| Bead filler height (%) | | 21 | 21 | 21 | 21 |
| Bead filler tan δ @ 60° C. | | 0.17 | 0.17 | 0.17 | 0.17 |
| Under tread rubber layer hardness @ 20° C. | | 85 | 78 | 78 | 78 |
| Under tread rubber layer average thickness (mm) | | 1.0 | 5.0 | 1.0 | 1.0 |
| Under tread rubber layer tan δ @ 60° C. | | 0.25 | 0.21 | 0.32 | 0.21 |
| Cap tread rubber layer hardness @ 20° C. | Vehicle Outer Side | 73 | 73 | 73 | 73 |
| | Vehicle Inner Side | 73 | 73 | 73 | 73 |
| Cap tread rubber layer tan δ @ 60° C. | Vehicle Outer Side | 0.33 | 0.33 | 0.33 | 0.33 |
| | Vehicle Inner Side | 0.28 | 0.28 | 0.28 | 0.33 |
| Groove area ratio (%) | Vehicle Outer Side | 35 | 35 | 35 | 35 |
| | Vehicle Inner Side | 35 | 35 | 35 | 35 |
| High-speed durability (index) | | 100 | 105 | 95 | 95 |
| High-speed lane changing performance | | 7.5 | 8 | 6.5 | 6.5 |
| Riding Comfort | | 6.5 | 6 | 7 | 7 |
| Variation in steering stability performance (index) | | 102 | 105 | 95 | 100 |

*As used in Table 1, "W.E." is an abbreviation for "Working Example".

As shown in Table 1, compared to the Conventional Example, the tires of Working Examples 1 to 5 displayed superior high-speed lane changing performance (steering stability during high-speed travelling) and high-speed durability without negatively affecting riding comfort, and also displayed little variation in steering stability performance due to continued traveling.

On the other hand, the riding comfort of the tire of Comparative Example 1 was negatively affected due to the hardness at 20° C. of the rubber composition forming the under tread rubber layer being too high. Moreover, the riding comfort of the tire of Comparative Example 2 was negatively affected due to the average thickness of the under tread rubber layer being too great. Furthermore, the high-speed lane changing performance and the high-speed durability of the tire of Comparative Example 3 were insufficient due to the tan δ at 60° C. of the rubber composition forming the under tread rubber layer being too high. Finally, the high-speed lane changing performance and the high-speed durability of the tire of Comparative Example 4 were insufficient due to the cap tread rubber layers of the tread portion being formed from a single type of rubber composition.

What is claimed is:

1. A pneumatic tire having a designated tire inner side/outer side mounting orientation when mounted on a vehicle, comprising:
    at least two types of cap tread rubber layers made from differing rubber compositions disposed in a tread portion so as to be adjacent to each other in a tire width direction, wherein
        a tan δ at 60° C. of a rubber composition forming the cap tread rubber layer on a vehicle outer side is greater than a tan δ at 60° C. of a rubber composition forming the cap tread rubber layer on a vehicle inner side,
        a ratio (tan δH/tan δL) of a maximum tan δH to a minimum tan δL at 60° C. of the rubber compositions forming the at least two types of cap tread rubber layers is from 1.05 to 1.80, the hardness of the at least two types of cap tread rubber layers is the same at 20° C.,
        an under tread rubber layer is disposed in the tread portion as a base for the at least two types of cap tread rubber layers, wherein
        an average thickness of the under tread rubber layer is from 0.8 mm to 4.0 mm, a hardness at 20° C. of a rubber composition forming the under tread rubber layer is from 73 to 83 and is greater than a hardness at 20° C. of the rubber compositions forming the at least two types of cap tread rubber layers, and
        a tan δ at 60° C. of the rubber composition forming the under tread rubber layer is 0.25 or less.

2. The pneumatic tire according to claim 1, wherein:
    at least one main groove extending in a tire circumferential direction is provided in the tread portion, the at least one main groove forming an asymmetric tread pattern wherein a groove area ratio GAo of a ground contact region from a tread center-line to the vehicle outer side is less than a groove area ratio GAi of a ground contact region from the tread center-line to the vehicle inner side.

3. The pneumatic tire according to claim 2, wherein:
    a difference (GAi−GAo) between the groove area ratio GAo of the ground contact region on the vehicle outer side and the groove area ratio GAi of the ground contact region on the vehicle inner side is from 1% to 15%.

4. The pneumatic tire according to claim 1, wherein:
    a carcass layer with a single-ply construction is mounted, having a cord angle with respect to the tire circumferential direction of from 75° to 90°, between a pair of bead portions, and
    a belt layer is disposed on an outer circumferential side of the carcass layer corresponding to the tread portion, wherein
        the carcass layer is wrapped around a bead core disposed in each of the bead portions from a tire inner side to a tire outer side,
        a bead filler disposed on the bead core is sandwiched between a main body portion and a wrapped portion of the carcass layer, and
        the wrapped portion of the carcass layer is extended to a lower region of the belt layer so as to overlap with an end of the belt layer.

5. The pneumatic tire according to claim 4, wherein:
    a height of the bead filler from a bead heel is 30% or less of a tire cross-section height, and
    a tan δ at 60° C. of a rubber composition forming the bead filler is 0.20 or less.

6. The pneumatic tire according to claim 2, wherein:
    a carcass layer with a single-ply construction is mounted, having a cord angle with respect to the tire circumferential direction of from 75° to 90°, between a pair of bead portions, and
    a belt layer is disposed on an outer circumferential side of the carcass layer corresponding to the tread portion, wherein
        the carcass layer is wrapped around a bead core disposed in each of the bead portions from a tire inner side to a tire outer side,
        a bead filler disposed on the bead core is sandwiched between a main body portion and a wrapped portion of the carcass layer, and
        the wrapped portion of the carcass layer is extended to a lower region of the belt layer so as to overlap with an end of the belt layer.

7. The pneumatic tire according to claim 3, wherein:
    a carcass layer with a single-ply construction is mounted, having a cord angle with respect to the tire circumferential direction of from 75° to 87°, between a pair of bead portions, and
    a belt layer is disposed on an outer circumferential side of the carcass layer corresponding to the tread portion, wherein
        the carcass layer is wrapped around a bead core disposed in each of the bead portions from a tire inner side to a tire outer side,
        a bead filler disposed on the bead core is sandwiched between a main body portion and a wrapped portion of the carcass layer, and
        the wrapped portion of the carcass layer is extended to a lower region of the belt layer so as to overlap with an end of the belt layer.

8. The pneumatic tire according to claim 7, wherein:
    a height of the bead filler from a bead heel is 30% or less of a tire cross-section height, and
    a tan δ at 60° C. of a rubber composition forming the bead filler is 0.20 or less.

9. The pneumatic tire according to claim 4, wherein the cord angle is from 80° to 87°.

10. The pneumatic tire according to claim 1, wherein the tan δ at 60° C. of the rubber composition forming the cap tread rubber layer on the vehicle outer side is in a range of from 0.10 to 0.50.

11. The pneumatic tire according to claim 1, wherein the tan δ at 60° C. of the rubber composition forming the cap tread rubber layer on the vehicle inner side is in a range of from 0.10 to 0.50.

12. The pneumatic tire according to claim 1, further comprising a boundary between the cap tread rubber layers on the vehicle inner and outer sides under a main groove that extends in a tire circumferential direction in the tread portion.

13. The pneumatic tire according to claim 1, wherein the average thickness of the under tread rubber layer is from 7% to 50% of a maximum thickness of all of the tread rubber layers, including the at least two types of cap tread rubber layers and the under tread rubber layer.

14. The pneumatic tire according to claim 1, wherein the tan δ at 60° C. of the rubber composition forming the under tread rubber layer is 0.03.

15. The pneumatic tire according to claim 5, wherein the tan δ at 60° C. of the rubber composition forming the bead filler is 0.03.

16. The pneumatic tire according to claim 5, wherein the height of the bead filler from a bead heel is 10 mm.

17. The pneumatic tire according to claim 3, wherein:
the difference (GAi−GAo) between the groove area ratio GAo of the ground contact region on the vehicle outer side and the groove area ratio GAi of the ground contact region on the vehicle inner side is from 2% to 13%.

18. The pneumatic tire according to claim 3, wherein a groove area ratio GA of a total ground contact range is from 20 to 40%.

19. The pneumatic tire according to claim 1, wherein the average thickness of the under thread rubber layer is from 30 mm to 4.0 mm

* * * * *